United States Patent [19]

Donado

[11] Patent Number: 5,312,582
[45] Date of Patent: May 17, 1994

[54] POROUS STRUCTURES FROM SOLID SOLUTIONS OF REDUCED OXIDES

[75] Inventor: Rafael A. Donado, Chicago, Ill.

[73] Assignee: Institute of Gas Technology, Chicago, Ill.

[21] Appl. No.: 13,706

[22] Filed: Feb. 4, 1993

[51] Int. Cl.$^5$ .............................................. B22F 1/00
[52] U.S. Cl. ......................................... 419/19; 419/22; 419/45; 419/31; 419/58; 75/232; 75/234; 75/951

[58] Field of Search ................... 419/2, 19, 22, 25, 38, 419/31, 45, 54, 57, 58; 75/951, 232, 234

[56] References Cited

U.S. PATENT DOCUMENTS

| | | | |
|---|---|---|---|
| 2,837,428 | 6/1958 | Brown | 419/19 |
| 3,050,386 | 8/1962 | von Döhren et al. | 419/2 |
| 3,143,789 | 8/1964 | Iler | 75/252 |
| 3,158,473 | 11/1964 | Gatti | 419/19 |
| 3,290,144 | 12/1966 | Iler | 419/22 |
| 3,607,433 | 9/1971 | Isenberg et al. | 427/115 |
| 3,821,036 | 6/1974 | Copeland et al. | 419/29 |
| 3,953,237 | 4/1976 | Epstein et al. | 429/41 |
| 4,238,557 | 12/1980 | Schulte et al. | 429/212 |
| 4,247,604 | 1/1981 | Marianowski et al. | 429/40 |
| 4,251,344 | 2/1981 | Needes | 204/290 R |
| 4,317,866 | 3/1982 | Trocciola et al. | 429/41 |
| 4,386,040 | 5/1983 | Baumgartner et al. | 264/56 |
| 4,386,960 | 6/1983 | Iacovangelo et al. | 419/9 |
| 4,407,775 | 10/1983 | Holman, Jr. et al. | 419/36 |
| 4,410,607 | 10/1983 | Arons et al. | 429/40 |
| 4,411,968 | 10/1983 | Reiser et al. | 429/41 |
| 4,436,794 | 3/1984 | Takeuchi et al. | 429/40 |
| 4,654,195 | 3/1987 | Wnuck et al. | 419/2 |
| 4,659,379 | 4/1987 | Singh et al. | 75/234 |
| 4,708,917 | 11/1987 | Swarr et al. | 429/40 |
| 4,714,586 | 12/1987 | Swarr et al. | 419/2 |
| 4,752,500 | 6/1988 | Donado | 427/115 |
| 4,762,558 | 8/1988 | German et al. | 75/246 |
| 4,797,379 | 1/1989 | Patel et al. | 502/101 |
| 4,800,052 | 1/1989 | Swarr et al. | 264/65 |
| 4,902,587 | 2/1990 | Saitoh et al. | 429/45 |
| 4,939,111 | 7/1990 | Kaun et al. | 502/101 |
| 4,943,496 | 7/1990 | Okada et al. | 429/45 |
| 4,985,071 | 1/1991 | Tabata et al. | 75/246 |
| 4,992,233 | 2/1991 | Swaroop et al. | 419/2 |
| 4,996,022 | 2/1991 | Shindo et al. | 419/2 |
| 4,999,155 | 3/1991 | Ong et al. | 419/2 |
| 5,041,159 | 8/1991 | Doyon et al. | 75/232 |

OTHER PUBLICATIONS

U.S. Statutory Invention Registration No. H16, Jan. 7, 1986.

Primary Examiner—Donald P. Walsh
Assistant Examiner—Anthony R. Chi
Attorney, Agent, or Firm—Speckman, Pauley & Fejer

[57] ABSTRACT

A process for producing porous structures for use in molten carbonate fuel cells in which a powder comprising at least one of a non-alloyed metal powder and a metal oxide powder, and a ceramic oxide powder is mixed, formed into a desired shape and sintered in an oxidizing atmosphere at a temperature between 900° C. and about 1400° C. via reactive oxidation to form a sintered oxide structure, which is then cooled to 700° C. to 1100° C. and treated in a reducing atmosphere to form a metallic structure with the non-reducible oxide dispersed within the metal.

26 Claims, No Drawings

POROUS STRUCTURES FROM SOLID SOLUTIONS OF REDUCED OXIDES

BACKGROUND OF THE INVENTION

1. Field of the Invention

This invention relates to a process for producing high-strength, high-porosity structures for use as components of molten carbonate fuel cells, having good in-cell performing properties without the use of expensive alloys and/or alloying elements. In particular, this invention relates to a process for producing porous structures, such as electrodes and bubble barriers in molten carbonate fuel cells using low cost metal powders and/or metal oxide powders and ceramic oxide powders.

2. Description of Prior Art

Porous structures suitable for use in molten carbonate fuel cells made from metal alloys are well known in the prior art. Common among such structures are structures made from nickel/aluminum alloys, nickel/chromium alloys, and nickel/copper alloys. U.S. Pat. No. 4,999,155 teaches a method for forming porous oxide dispersion strengthened molten carbonate fuel cell anodes in which an alloy comprising a base metal and an alloying metal is formed, preferably in powder form, and sintered to form a porous anode structure in a reducing environment. The resulting structure is subsequently subjected to conditions in which the base metal is reduced and the alloying metal is oxidized, thereby causing internal oxidation of the alloying metal. Sintering is carried out at a temperature in the range of 500° C. to 1000° C. in an inert atmosphere comprised of nitrogen, argon, helium, or alternatively, in a vacuum or gas-tight container. The base metal is selected from the group consisting of nickel, copper, and cobalt. The alloying metal is selected from the group consisting of iron, chromium, aluminum, titanium, silicon, beryllium, magnesium, thorium, and yttrium. U.S. Pat. No. 5,041,159 similarly teaches a nickel/aluminum alloy which is simultaneously oxidized and sintered at temperatures of 800°–1100° C. in an atmosphere in which the alloying material (aluminum) is exclusively substantially internally oxidized forming a sintered porous plaque containing nickel metal and oxidized alloying material. U.S. Pat. No. 4,762,558 teaches a process for producing nickel aluminide, $Ni_3Al$, in which a mixture of elemental nickel powder and elemental aluminum powder are sintered in a vacuum or dry inert atmosphere at a temperature of 500°–750° C. U.S. Pat. No. 4,939,111 teaches a porous sintered cathode for a molten carbonate fuel cell formed from a metal oxide and lithium manganate or lithium ferrite at a temperature up to 950° C.

The preparation of sintered structures also is taught by U.S. Pat. No. 4,996,022 in which a process for producing a sintered body in which one or more metal powder particles are mixed with an organic binder and formed into a predetermined shape is disclosed. After removing the binder from the "green" body by preheating the "green" body in an inert gas atmosphere at a temperature up to about 800° C., the resulting porous body is sintered at a temperature up to about 1200° C. U.S. Pat. No. 4,992,233 similarly teaches a process for sintering alloys of metal powders, preferably aluminum and iron powders, into structures in which the metal powders are prefired at a temperature of 500°–650° C. in an oxidizing atmosphere followed by sintering in an inert or reducing atmosphere at a temperature of about 1275°–1450° C. U.S. Pat. No. 4,654,195 teaches a method for fabricating ribbed electrodes by depositing a composition of nickel, copper, and mixtures thereof and chromium onto a ribbed mold, pre-firing the molded composition in a reducing atmosphere at temperatures of 650°–900° C. and subsequently sintering the resulting electrode in a reducing atmosphere at temperatures of 1050°–1450° C. And, U.S. Pat. No. 4,410,607 teaches a process for preparing a porous sintered lithiated nickel oxide plaque in which a finely divided particulate oxide material is blended with a binder to form a solid mass which is subsequently sintered at a temperature of about 1000°–1200° C.

U.S. Pat. No. 4,411,968 teaches a composite matrix material for molten carbonate fuel cells having a matrix tape portion and a bubble barrier portion, the matrix tape portion comprising a sheet of a mixture of ceramic particles, particles inert to the molten carbonate environment and an organic polymer binder which burns off or volatilizes under fuel cell operating conditions. The bubble barrier portion is a fine pore, ion permeable sheet of material which is bonded to the matrix tape.

U.S. Pat. No. 4,407,775 teaches a process for producing structures from metallic (alloy) powders, such as high speed steel alloy powders and certain high alloy ferrous powders, in which the powder is formed into the desired shape and sintered at a temperature of about 1200°–1250° C. in an inert atmosphere or a vacuum.

U.S. Pat. No. 4,386,040 teaches a process for producing a lithiated nickel oxide (lithium doped nickel oxide) cathode for a molten carbonate fuel cell in which a "green" body consisting of a mixture of nickel powder and lithium oxide is fired in air at temperatures of about 600°–1000° C. producing a fired body of $Li_xNi_{(1-x)}O$ and having a porosity of at least about 50% by volume of the total volume of the body.

U.S. Pat. No. 4,251,344 teaches an electrode having a porous nickel surface formed from a paste consisting of a powder mixture of $NiAl_3$ and $Ni_3B$ which is pre-fired at a temperature of about 450°–650° C. in air and subsequently sintered in a nitrogen atmosphere at a temperature of about 800°–900° C. followed by removal of the intermetallic aluminum, boron and boron oxide by dissolution with sodium hydroxide, forming the electrode. U.S. Pat. No. 4,985,071 teaches a process for producing a base metal thin film for use as an electrode using a printing technique in which a thin layer of a base metal oxide is formed on a substrate and sintered at temperatures of 600° C. and below in a reducing atmosphere. U.S. Pat. No. 4,943,496 teaches a process for making a fuel cell electrode in which a metal powder of nickel, cobalt, copper, chromium and iron, and mixtures or alloys thereof, is mixed with an organic binder and water to form a paste, dried at room temperature and fired in a hydrogen atmosphere at a temperature of about 750°–1000° C. After impregnating one surface with a water repellent solution, the other surface is treated with a ceramic oxide precursor solution and then, the electrode is fired in a reducing atmosphere. This process is carried out in a reducing atmosphere and as such does not utilize a reactive oxide method which is carried out in air or an oxygen containing gas. U.S. Pat. No. 4,902,587 teaches an anode for a molten carbonate fuel cell prepared from base materials of metal and metal oxides including nickel, chromium and cobalt and chromium oxide in which the mixture of base metals is sintered, with chromium being selectively oxidized.

U.S. Pat. No. 4,708,917 and related U.S. Pat. No. 4,800,052 teach a process for producing molten carbonate fuel cell cathodes from metal oxides including nickel powders which are pre-fired at temperatures of 600°–1000° C. in an oxidizing atmosphere, formed into the desired electrode shape, and sintered at a temperature of 850°–1250° C. in an oxidizing atmosphere. U.S. Pat. No. 2,837,428 teaches a process for sintering chromium-alumina metal ceramics in which the powders are formed into a desired shape and sintered at a temperature of about 1500°–1900° C. in an inert, reducing, or non-oxidizing atmosphere, or in a vacuum. U.S. Pat. No. 3,607,433 teaches a method for preparing electrodes from metals or metal oxides in which the starting material is connected to a porous surface of an electrolyte and heated at temperatures from 1190° C. to 1800° C., depending on the oxide used as a starting material, in an inert atmosphere. The resulting electrode is cooled below 1000° C. and reduced in a furnace or in-situ in a fuel cell. U.S. Pat. No. 3,821,036 teaches a process for strengthening metals and alloys in which a base metal powder containing oxygen is blended with a reactive metal powder, pressed, sintered, densified and held below the sintering temperature of about 1500°–2400° C. to form an ultra-fine dispersion reactive metal oxide throughout the base metal. U.S. Pat. No. 3,050,386, U.S. Pat. No. 3,953,237 and U.S. Pat. No. 4,436,794 generally teach electrodes having a base material of metal and/or metal oxides.

The use of alloyed metals for producing components of molten carbonate fuel cells is also taught by U.S. Pat. No. 4,238,557 which teaches sintering of nickel and chrome molded articles; U.S. Pat. No. 4,247,604 which utilizes nickel or cobalt alloyed with up to 20% chromium; and U.S. Pat. No. 4,659,379 which utilizes nickel-/aluminum alloys to produce molten carbonate fuel cell anodes by first partially oxidizing the powder so that the exterior of the material is a nickel oxide layer and the interior of the material is a nickel metal throughout which is dispersed the oxide of the alloying material.

Other prior art references teaching methods for preparing molten carbonate fuel cell components are U.S. Pat. No. 4,317,866 which utilizes a ceria anode; U.S. Pat. No. 4,386,960 which utilizes a nickel or copper coated ceramic powder encapsulated by a metal component; U.S. Pat. No. 4,797,379 which adds an alkali hydroxide or alkali hydroxide mixed with a ceramic constituent to a preexisting nickel, nickel-cobalt, or nickel-chromium porous structure; and U.S. Pat. No. 4,752,500 which teaches deposition of a stabilizing agent into a preexisting structure of nickel, cobalt, copper and mixture and alloys thereof by dipping the structure into precursor aqueous solutions of the desired agent.

A major disadvantage of known methods of preparing porous metallic structures having ceramic oxides dispersion strengthening agents inside the metal grain is their use of expensive metal alloy powders made of a base metal and an alloying metal element or mixtures of metal powders made of a base metal and an alloying metal element. If alloys are used, the oxide of the alloying element if formed prior to, during or after sintering; and, if mixtures of metal powders are used, they are sintered first to form an alloy and then the alloying element is oxidized. In either case, the cost for preparing porous metallic structures using metal alloys is substantial due to the high cost of metal alloys.

SUMMARY OF THE INVENTION

Accordingly, it is an object of this invention to provide a process for producing high-strength porous structures for use as electrodes and bubble barriers in molten carbonate fuel cells using low cost metal powders, metals oxides and mixtures thereof.

It is another object of this invention to produce high-strength porous structures for use as electrodes and bubble barriers in molten carbonate fuel cells without using expensive alloys and/or alloying elements.

It is another object of this invention to provide a process for producing an oxide dispersion strengthened porous structure for use in molten carbonate fuel cells.

These and other objects are achieved by a process for producing porous structures for use in molten carbonate fuel cells in which a powder selected from the group consisting of a non-alloyed metal, a metal oxide and mixtures thereof is mixed with a ceramic oxide powder and the resulting mixture shaped into a desired shape. The structure is sintered at a temperature between about 900° C. and about 1400° C. in a gaseous atmosphere, forming a sintered oxide structure. The sintered oxide structure is cooled to a temperature between about 700° C. and about 1100° C. and, thereafter, contacted with a reducing gas, forming a porous metallic structure having a dispersed-oxide strengthening agent.

In a preferred embodiment of the process of this invention, the metal and/or metal oxide powder is mixed with a ceramic oxide powder and the resulting mixture shaped into a tape structure. The tape is sintered, forming a sintered oxide tape structure which, in turn, is cooled and contacted with a reducing gas, forming a porous metallic tape structure having a dispersed-oxide strengthening agent.

More particularly, the process of this invention comprises forming a "green", or presintered, tape from mixtures of non-alloyed metal, metal oxides and ceramic oxides and sintering the "green" tape by means of reactive oxide sintering at temperatures of about 1000°–1400° C. and then reducing the reducible metal oxide in the sintered oxide structure to obtain an essentially metallic structure with a non-reducible ceramic oxide dispersed inside the grains of reduced metal. When the tape is made of mixtures of non-alloyed metals and a ceramic oxide, or mixtures of non-alloyed metal, metal oxides and ceramic oxides, an oxidizing atmosphere, such as air, is used first, up to the sintering temperature, to oxidize the elemental metal. Thereafter, an inert gas can be used, or alternatively, the inert gas can be used after the oxide-containing tape has been sintered.

In accordance with one embodiment of the process of this invention, when the "green" tape is made only from mixtures of metal oxides and ceramic oxides, either an inert gas or air may be used from the outset. After the mixture has been completely oxidized, reactive oxide sintering occurs at around 1200° C. to 1400° C. During the reactive sintering step, the mixture of oxides not only sinters but also reacts. Thus, for example, if the mixture initially contains copper metal and alumina, first copper oxide is formed during heat-up in air and then the copper oxide reacts with the alumina to form $CuAl_2O_4$ dissolved in copper oxide. Similarly, the use of a mixture of nickel metal and alumina results in the formation first of nickel oxide and then $NiAl_2O_4$. The reducible metal oxides, copper oxide or nickel oxide in these instances, in the sintered oxide structure are then reduced at a lower temperature using a reducing gas. In accordance with one embodiment of the process of this invention, reduction is carried out within a single furnace. In accordance with another embodiment of this invention, the sintered oxide structure is transferred to a separate furnace for reduction. In either case, what is obtained is an essentially metallic porous structure having non-reducible ceramic oxide dispersed within the metal grains. In accordance with yet another embodiment of the process of this invention, the oxidation and reaction of the oxides is carried out in a rotary kiln after which the reacted oxides are reduced and formed into "green" tapes which are sintered in an inert or reducing environment. In accordance with yet another embodiment of this invention, the tape is prepared with the reacted oxide mixture and the reduction is carried out during sintering in a reducing atmosphere.

DESCRIPTION OF PREFERRED EMBODIMENTS

In accordance with the process of this invention, high-strength, high-porosity structures are produced from metal powders, metal oxide powders and mixtures of metal and metal oxide powders, and ceramic oxide powders for use as anodes, anode bubble barriers and cathodes in molten carbonate fuel cells. The proportions of metal and oxide powders are varied, depending on the type and kind of structure desired. For example, bubble barriers having a very fine pore structure are better obtained from metal oxide and ceramic oxide powders. On the other hand, cathodes are better obtained from starting materials which are about 90–100% metal powders with the remainder being a ceramic oxide such as calcium oxide, or a calcium oxide-forming compound such as calcium carbonate or calcium acetate. Finally, anodes are better prepared from mixtures of metals, nickel oxide and a ceramic oxide.

Accordingly, in accordance with one embodiment of the process of this invention, cathode electrodes for use in molten carbonate fuel cells are produced by mixing non-alloyed metal with a ceramic oxide powder and forming said resulting mixture into a "green" structure having the desired shape for the electrodes. In accordance with a particularly preferred embodiment of the process of this invention, the structure is a tape formed by a tape casting process. The resulting tape structure is sintered by heating at an adequate rate to temperatures up to about 900° C. to about 1400° C. in a gaseous atmosphere comprising an oxygen-containing gas, such as air or air/nitrogen mixtures, resulting in oxidation of the non-alloyed metal. Thereafter, the resulting sintered oxide tape is soaked in air or a nitrogen atmosphere at the upper sintering temperature (about 1200° C.) resulting in dissolution and sintering of the oxides in the tape. Thereafter, the sintered oxide tape structure is cooled to a temperature between about 700° C. and about 1100° C. and, after purging the air, is contacted with a reducing gas to reduce the reducible oxides therein to metal, forming a porous metallic tape structure having a dispersed-oxide strengthening agent. It is to be noted that non-reducible oxides in the sintered oxide tape structure are not reduced, but rather remain as oxides. Reducing gases suitable for use in this process include hydrogen or a mixture of 10% hydrogen/90% nitrogen.

Cathodes for molten carbonate fuel cells are normally made in accordance with known prior art by in-situ oxidation and lithiation of a porous nickel structure that takes place during the first few hours of operation of the fuel cell. The oxidation/lithiation process causes substantial changes in the nickel structure. The sintered, unoxidized, state-of-the-art nickel cathode made in accordance with known methods generally is about 65–80% porous structure with about a 3.0 micron mean particle size. During the oxidation/lithiation process, the particles are fractured and form agglomerates of much smaller particles. This fracturing/oxidation process not only changes the mean pore size of the resulting nickel oxide, but also weakens the structure. In the process in accordance with this invention, the fracturing of the nickel particles, which in accordance with the prior art occurs in-situ, will now take place outside of the cell during the heat up process in an oxygen-containing atmosphere. The fractured particles are then sintered at about 1000°–1400° C. producing strong neck joints. These joints remain after reduction and reoxidation in accordance with the process of this invention, resulting in a stronger nickel oxide cathode structure.

Bubble barriers with very fine pore structures are produced in accordance with the process of this invention from metal oxide and ceramic oxide powders shaped into a "green" tape and sintered at a temperature between about 900°–1400° C. in air or a nitrogen atmosphere, resulting in dissolution and sintering of the oxides. Thereafter, the sintered oxide tape structure is cooled to a temperature of about 700° to about 1100° C. and, after purging the air, soaked in a reducing gas, such as hydrogen or 10% hydrogen/90% nitrogen, reducing the reducible oxides therein to metal and forming a porous metallic structure having a dispersed-oxide strengthening agent.

Anodes produced in accordance with the process of this invention are preferably prepared from mixtures of non-alloyed metals and metal oxides. For example, a 60% Cu/30%Ni/10%$Al_2O_3$ anode was prepared in accordance with the process of this invention by mixing copper metal (Cu) with nickel oxide (NiO) and alumina ($Al_2O_3$).

An anode bubble barrier having a fine pore structure was prepared in accordance with the process of this invention by mixing recycled lithiated NiO cathode with alumina in a portion of 1.74 grams of $Al_2O_3$ and 100 grams of lithiated NiO($Ni_{0.97}Li_{0.03}O_2$). Ni+2.8-%$LiAlO_2$ is obtained after sintering/reduction. A similar bubble barrier can be prepared from NiO and $Al_2O_3$(or $LiAlO_2$) if lithiated NiO is not available for recycling.

Cathodes, on the other hand, are made in accordance with the process of this invention, for example, from nickel metal and a nickel dissolution stabilizing agent, in particular, Ni+5%CaO or the equivalent amount of CaO produced from calcium carbonate or calcium acetate. The use of non-alloyed metal for producing cathodes in accordance with the process of this invention is critical to producing suitable cathode electrodes. Cathodes made from starting materials comprising only oxides would have a too small mean pore size and would flood.

The following Table provides a summary of porous metallic tape structures having a dispersed-oxide strengthening agent produced in accordance with the process of this invention. Various electrodes were prepared from mixtures of metals, metal oxides and ceramic oxides in different proportions and conditions. Metals used included nickel (Ni) and copper (Cu) and mixtures thereof; the oxides of these two metals, nickel oxide (NiO) and copper oxide (CuO) were also used.

Ceramic oxides used included aluminum oxide ($Al_2O_3$) and chromium oxide ($Cr_2O_3$). Lithium-ceramic oxide compounds used included lithium aluminate ($LiAlO_2$). Ceramic oxide precursor compounds included calcium acetate ($Ca[CH_3-COO]_2$). Other possible metals and metal oxides include cobalt (Co) and iron (Fe) and cobalt oxide (CoO) and iron oxide ($Fe_2O_3$) as well as the mixtures of the metals and metal oxides discussed. Other ceramic oxides that can be used include titanium oxide ($TiO_2$), zirconium oxide ($ZrO_2$), thorium oxide ($ThO_2$), yttrium oxide ($Y_2O_3$) and silicon oxide ($SiO_2$); the lithium-ceramic oxide compound of these ceramic oxides, as well as the precursors of the ceramic oxide can be used also.

TABLE

| TYPE OF SAMPLE | HEAT TREATMENT | RESULTS |
|---|---|---|
| Ni sinter with $Ca(CH_3COO)_2$ | 1000° C. in 15% $O_2$ Reduced at 650° C. | Strong. Final porosity 75% |
| $NiO/Fe_2O_3/Al_2O_3$ tape | 1100° C. in $N_2$ Reduced at 800° C. | Strong and metallic |
| $Cu/NiO/Al_2O_3$ (60% Cu/30% Ni/ 10% $Al_2O_3$) tape | 1100° C. in air Reduced at 700-750° C. | Very good and strong and has 4.5 μm mean pore size, 60% pore spectra porosity |
| $Cu/CuO/Al_2O_3$ tape (90% Cu/10% $Al_2O_3$) Overall | 1100° C. in air Reduced at 1000-750° C. | Sintered well. 6.2 μm mean pore size, 59.6% pore spectra porosity |
| Cu/20% $Al_2O_3$ tape | 1100° C. in air Reduced at 1000° C. | Well sintered 4.0 μm mps, 58.7% geometric porosity Good in cell test. |
| Ni/4% $Cr_2O_3$ tape | 1100° C. in air Reduced at 1000-750° C. | Well sintered and strong. 5.7 μm mean pore size. 71.3% pore spectra porosity |
| NiO/20% $Al_2O_3$ tape made from reduced powder | 1100° C. in air Reduced at 1100° C. to 750° C. | Well sintered and strong. 1.0 μm mean pore size, 63.5% pore spectra porosity |
| Ni/20% $Al_2O_3$ tape | As above | Well sintered. 3.0 μm mean pore size. 67% pore spectra porosity |
| Ni/5% $Al_2O_3$ tape | 1100° C. in air Reduced at 1000-750° C. | Very good and strong porosity 65.7% geometric porosity |
| Ni/5% $LiAlO_2$ | As above | Good and strong 63.5% geometric porosity |

Good and strong samples of Ni-$Al_2O_3$, Ni-$LiAlO_2$ and Ni-$Cr_2O_3$ were also prepared by sintering in air at 1200° C. and at 1300° C. and reducing at 1000° C. The samples were generally reduced under a flow of 10%$H_2$/90%$N_2$. All proportions are given in weight percent.

In each of the examples shown in the Table, samples were soaked for 1-3 hours at the indicated temperature. Reduction was carried out by soaking or slow cool down in either a 75% $H_2$/25% $CO_2$ atmosphere or a 10% $H_2$/90%$N_2$ atmosphere.

In accordance with one embodiment of the process of this invention, heating of the "green" tape in an oxygen containing atmosphere resulting in oxidation, dissolution/reaction and sintering of the oxides in the tape is carried out in a first heating vessel and reduction of the reducible oxides in a reducing atmosphere is carried out in a second heating vessel. In accordance with another embodiment of this invention, the oxidation, dissolution/reaction and sintering of the oxides followed by cooling and reduction of the reducible oxides are carried out in a single heating vessel.

In accordance with yet another embodiment of this invention, the starting materials are mixed and heat treated in a rotary kiln at temperatures of 900°-1400° C. in an oxygen-containing atmosphere resulting in oxidation and dissolution/reaction of the powders. Thereafter, the powder may be treated with a reducing gas, such as 10% $H_2$/90% $N_2$, to reduce the reducible metals and obtain a metal powder with a dispersed—ceramic oxide strengthing agent. The resulting powder, if required, is milled and separated by size. Thereafter, the oxide is tape cast forming the "green" tape and sintered in an inert or reducing atmosphere forming a porous metallic tape structure having a dispersed-oxide strengthening agent.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. A process for producing porous structures for use in molten carbonate fuel cells comprising:
   mixing a powder selected from the group consisting of a non-alloyed metal, a metal oxide and mixtures thereof with one of a ceramic oxide precursor powder and a ceramic oxide powder and shaping said mixture into a structure;
   sintering said structure at a temperature between about 900° C. and about 1400° C. in a gaseous atmosphere forming a sintered oxide structure;
   cooling said sintered oxide structure to a temperature between about 700° C. and about 1100° C.; and
   contacting said cooled sintered structure with a reducing gas, forming a porous metallic structure having a dispersed-oxide strengthening agent.

2. A process in accordance with claim 1, wherein said mixture is formed into a tape structure.

3. A process in accordance with claim 1, wherein said gaseous atmosphere comprises an oxygen-containing gas when said structure comprises a non-alloyed metal, oxidizing said non-alloyed metal, followed by an inert gas.

4. A process in accordance with claim 1, wherein said gaseous atmosphere is one of an inert atmosphere and an oxygen-containing gas followed by an inert gas when said structure does not contain a non-alloyed metal.

5. A process in accordance with claim 3, wherein said oxygen-containing gas is air.

6. A process in accordance with claim 4, wherein said oxygen-containing gas is air.

7. A process in accordance with claim 4, wherein said inert atmosphere is nitrogen.

8. A process in accordance with claim 1, wherein said non-alloyed metal is selected from the group consisting of nickel, cobalt, copper and iron and mixtures thereof and said metal oxide is selected from the group consisting of nickel oxide, cobalt oxide, copper oxide, iron oxide and mixtures thereof.

9. A process in accordance with claim 1, wherein said ceramic oxide is selected from the group consisting of aluminum oxide, chromium oxide, titanium oxide, zirconium oxide, thorium oxide, yttrium oxide, silicon oxide, lithium oxide compounds selected from the group consisting of lithium aluminate, lithium chromate, lithium dichromate, lithium titanate, lithium zirconate and lithium silicate, and mixtures thereof.

10. A process in accordance with claim 3, wherein said inert gas is nitrogen.

11. A process in accordance with claim 1, wherein said reducing gas comprises hydrogen.

12. A process in accordance with claim 1, wherein said sintering is carried out in a first heating vessel and said sintered oxide structure is reduced in a second heating vessel.

13. A process for producing porous structures for use in molten carbonate fuel cells comprising:
   oxidizing a powder comprising a non-alloyed metal and a ceramic oxide powder, forming an oxide powder mixture;
   chemically reducing said oxide powder mixture, forming a reduced metal/oxide powder mixture;
   shaping said reduced metal/oxide powder mixture into a structure;
   sintering said structure at a temperature between about 900° C. and about 1300° C. in one of an inert and a reducing gas atmosphere forming a porous metallic structure with dispersed oxide; and
   cooling said porous metallic structure.

14. A process in accordance with claim 13, wherein said reduced metal/oxide powder mixture is shaped into a tape structure.

15. A process in accordance with claim 13, wherein said powder is oxidized in a rotary kiln at a temperature between about 900° C. and about 1400° C. through which an oxygen-containing gas is flowing.

16. A process in accordance with claim 15, wherein said oxygen-containing gas is air.

17. A process in accordance with claim 13, wherein said powder further comprises at least one metal oxide.

18. A process for producing porous structures for use in molten carbonate fuel cells comprising:
   mixing a powder selected from the group consisting of a non-alloyed metal, a metal oxide and mixtures thereof with one of a ceramic oxide precursor powder and a ceramic oxide powder;
   heat-treating said mixture in an oxidizing gaseous atmosphere at a temperature between about 900° C. and about 1400° C. forming an oxide powder mixture, followed by an inert gas atmosphere;
   contacting said oxide powder mixture with a reducing gas forming a reduced metal/oxide powder mixture;
   shaping said reduced metal/oxide powder mixture into a structure;
   sintering said structure at a temperature between about 900° C. and about 1400° C. in one of an inert and a reducing gas atmosphere, forming a porous metallic structure with dispersed oxide; and
   cooling said porous metallic structure.

19. A process in accordance with claim 18, wherein said reduced metal/oxide powder mixture is shaped into a tape structure.

20. A process in accordance with claim 18, wherein said powder is oxidized in a rotary kiln at a temperature between about 900° C. and about 1400° C. through which an oxygen-containing gas is flowing.

21. A process in accordance with claim 20, wherein said oxygen-containing gas is air.

22. A process in accordance with claim 18, wherein said oxidizing gaseous atmosphere is one of air and an oxygen-containing gas.

23. A process in accordance with claim 18, wherein said inert gas atmosphere is nitrogen.

24. A process in accordance with claim 18, wherein said reducing gas atmosphere comprises hydrogen.

25. A process in accordance with claim 18, wherein said non-alloyed metal is selected from the group consisting of nickel, cobalt, copper and iron and mixtures thereof and said metal oxide is selected from the group consisting of nickel oxide, cobalt oxide, copper oxide, iron oxide and mixtures thereof.

26. A process in accordance with claim 18, wherein said ceramic oxide is selected from the group consisting of aluminum oxide, chromium oxide, titanium oxide, zirconium oxide, thorium oxide, yttrium oxide, silicon oxide, lithium oxide compounds selected from the group consisting of lithium aluminate, lithium chromate, lithium dichromate, lithium titanate, lithium zirconate and lithium silicate, and mixtures thereof.

* * * * *